United States Patent [19]
Kohriyama

[11] 4,014,588
[45] Mar. 29, 1977

[54] MOUNTING DEVICE FOR ELASTICALLY MOUNTING CAB

[75] Inventor: Yoshimasa Kohriyama, Machida, Japan

[73] Assignee: Caterpillar Mitsubishi Ltd., Tokyo, Japan

[22] Filed: Apr. 10, 1975

[21] Appl. No.: 566,870

[30] Foreign Application Priority Data

Apr. 15, 1974 Japan .............................. 49-40999

[52] U.S. Cl. .......................... 296/35 R; 248/358 R; 403/221; 403/225; 403/228
[51] Int. Cl.² .......................................... B62D 23/00
[58] Field of Search ............. 296/35 R; 248/21, 22, 248/18, 15, 358 R; 403/225, 226, 228, 221, 220

[56] References Cited

UNITED STATES PATENTS

| | | | |
|---|---|---|---|
| 2,019,052 | 10/1935 | Lord | 403/221 X |
| 2,076,034 | 4/1937 | Lampman | 248/358 X |
| 2,208,709 | 7/1940 | Tjaarda | 296/35 R |
| 3,112,950 | 12/1963 | Jaskowiak | 296/35 R |
| 3,199,186 | 8/1965 | Simpson | 403/228 X |
| 3,525,548 | 8/1970 | Mutka | 296/35 R |
| 3,834,754 | 9/1974 | Zajichek | 296/35 R |

Primary Examiner—Albert J. Makay
Assistant Examiner—Donald W. Underwood
Attorney, Agent, or Firm—Phillips, Moore, Weissenberger, Lempio & Majestic

[57] ABSTRACT

A device for elastically supporting an upper structure on a frame and thus reducing the vibration which is transmitted from the frame to the upper structure. The device comprises a main elastic member having a through-hole in its center, the main elastic member including a small-diameter portion at its upper part to define its shoulder, the center of the lower end of the main elastic member projecting beyond its peripheral part by a predetermined distance; a tubular inward rigid member having substantially the same length as the through-hole of the main elastic member, which rigid member is disposed within the through-hole with its outer wall being fixed to the inner wall of the through-hole; an outward rigid member fixed to the peripheral side wall of the main elastic member; a substantially annular elastic member having a central through opening adapted to receive the small-diameter portion of the main elastic member; and a bolt whose axial part can be inserted in the inward rigid member and a nut to secure the bolt. According to this device, the upper structure is elastically supported chiefly by the elasticity of the main elastic member.

7 Claims, 6 Drawing Figures

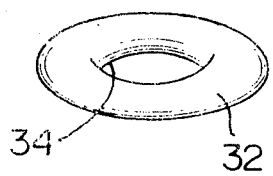
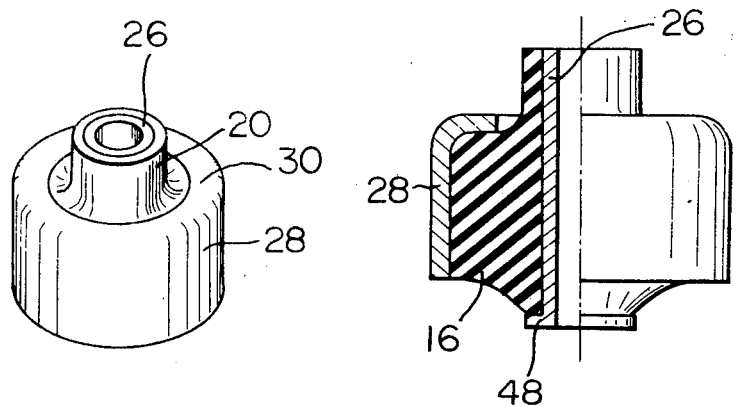
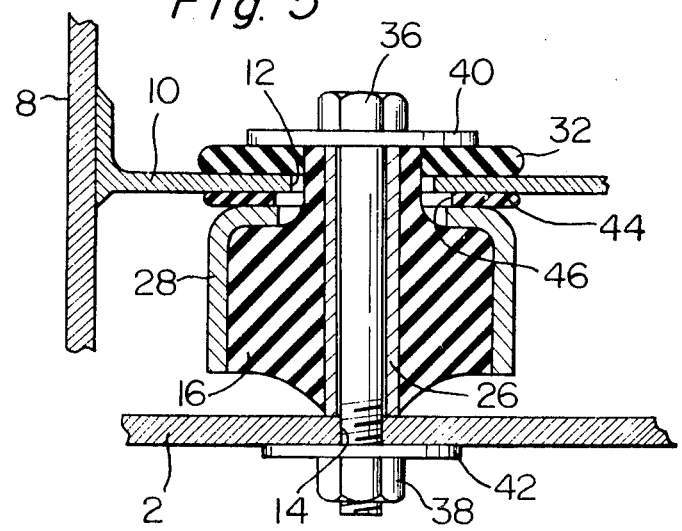

MOUNTING DEVICE FOR ELASTICALLY MOUNTING CAB

BACKGROUND OF THE INVENTION

This invention relates to a device for mounting an upper structure such as a cab on a frame of, for example, an earth-moving or construction vehicle. More specifically, the invention relates to a device for elastically supporting the upper structure on the frame and thus reducing the vibration transmitted from the frame to the upper structure.

In an earth-moving vehicle such as a tractor, the cab is mounted on the frame. The frame vibrates during vehicle operation, and when the vibration is directly transmitted to the cab, the operator in the cab is subjected to this vibration. Since the earth-moving vehicle is generally operated continuously for long periods of time, the above vibration becomes an important problem.

With a view towards reducing this vibration, a mounting device was proposed in which an elastic member is interposed between the frame and the cab of a vehicle to support the cab elastically on the frame by the compression elasticity of the elastic member, to thereby reduce the vibration transmitted from the frame to the cab. Such a mounting device is disclosed, for example, in Japanese Utility Model application No. 75525/71 (laid open to public inspection under Japanese Laid-Open Utility Model Publication No. 33019/73).

Such a mounting device is still not fully satisfactory. In this mounting device, an elastic member having a relatively high coefficient of elasticity must be used to support the cab on the frame stably, and therefore, the vibration transmitted from the frame to the cab cannot be fully reduced. In addition, with the conventional mounting device, the cab cannot be firmly supported in a horizontal direction. When a high rate of acceleration is exerted on the vehicle, the conventional mounting device cannot support the cab with high reliability. Another disadvantage of the conventional mounting device is that mounting of the cab on the frame is relatively difficult and the elastic properties of the elastic member varies according to the tightening torque at the time of assembling, whereby the elastic member may deteriorate within a relatively short period of time.

Accordingly, a main object of this invention is to provide an improved mounting device capable of supporting an upper structure such as a cab on a frame both in the vertical and horizontal directions with high reliability, and sufficiently reducing the vibration transmitted from the frame to the upper structure.

Another object of this invention is to provide such a mounting device with which the cab can be mounted relatively simply.

Still another object of this invention is to provide such a mounting device having a relatively long effective life.

A further object of this invention is to provide an earth-moving or construction vehicle in which a cab is mounted on a frame by such a mounting device.

SUMMARY OF THE INVENTION

According to this invention, there is provided a device for supporting an upper structure on a frame elastically and thus reducing the vibration transmitted from the frame to the upper structure, said device comprising a main elastic member having a through-hole in its center, the main elastic member including a small-diameter portion at its upper part to define its shoulder, the center of the lower end of the main elastic member projecting beyond its peripheral part by a predetermined distance; a tubular inward rigid member having substantially the same length as the through-hole of the main elastic member, which rigid member is disposed within the through-hole with its outer wall being fixed to the inner wall of the through-hole; an outward rigid member fixed to the peripheral side wall of the main elastic member; a substantially annular elastic member having a central through opening adapted to receive the small-diameter portion; and a bolt whose axial part can be inserted in the inward rigid member and a nut to secure the bolt; characterized in that said main elastic member is positioned on the frame having a hole through which the axial part of the bolt can be passed, the small-diameter portion of the main elastic member is inserted in a hole of the floor of the upper structure, the annular elastic member is received in the small-diameter portion of the main elastic member so as to hold the floor of the upper structure between it and the shoulder portion of the main member, and the frame, the main elastic member, the floor of the upper structure and the annular elastic member are clamped together by the bolt whose axial portion is inserted in the inward rigid member and in the hole of the frame and the nut to secure the bolt, thereby to support the upper structure elastically on the frame.

The mounting device of this invention supports the upper structure elastically in the vertical direction by the shear elasticity of the main elastic member, and in the horizontal direction, supports it elastically by the compression elasticity of the main elastic member. Thus, the mounting device of this invention can sufficiently reduce the vibration transmitted from the frame to the upper structure mainly by the elasticity of the main elastic member.

The above and other objects and advantages of this invention will become more apparent from the following description of preferred embodiments of this invention taken together with the accompanying drawings.

BRIEF DESCRIPTION OF THE DRAWINGS

FIG. 4 is a partly broken-away perspective view of the mounting device shown in FIG. 2;

FIG. 5 is a sectional view showing the details of a modified embodiment of the mounting device of this invention; and FIG. 6 is a partly sectional side elevation of a part of another modified embodiment of the mounting device of this invention.

DETAILED DESCRIPTION OF PREFERRED EMBODIMENTS

Figure 1:
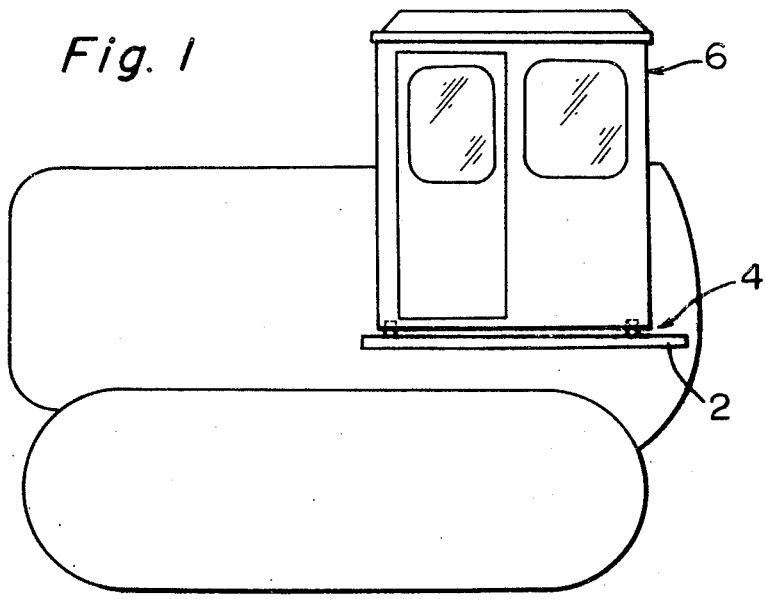
FIG. 1 is a simplified side elevation of a tractor in which the cab is mounted on the frame by the mounting device of this invention.

FIG. 1 illustrates in a simplified form a tractor equipped with an upper structure or cab mounted elastically on a platform or frame of the vehicle by a mounting device shown as a whole by numeral 4 at the four corners or more than four portions of the platform or frame.

Figure 2:
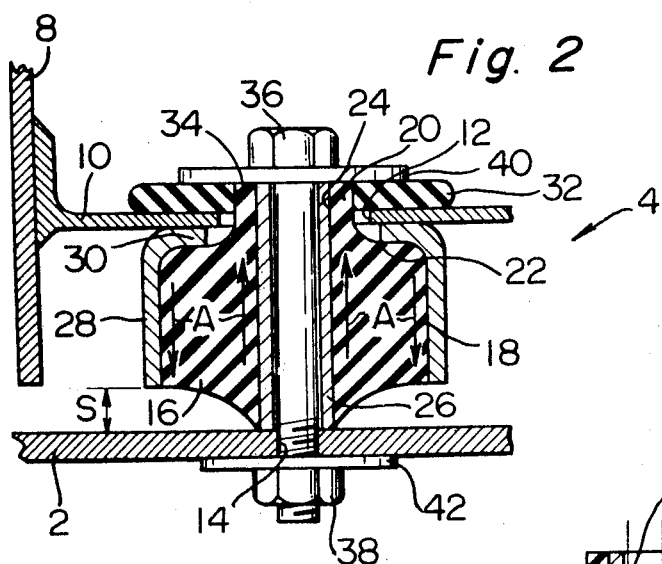
FIG. 2 is a sectional view showing the details of one embodiment of the mounting device of this invention.
Figure 3:
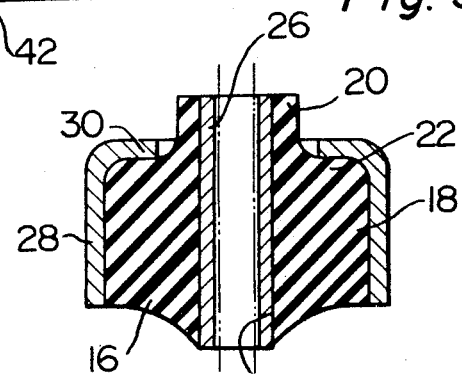
FIG. 3 is a sectional view of a part of the mounting device shown in FIG. 2.

The mounting device 4 of this invention will be described in detail by reference to FIGS. 2 to 4. A cab 6 elastically mounted on a frame 2 of the vehicle has a floor 10 fixed to its side wall 8 by welding or other suitable means. The floor 10 has a hole 12 formed therein. A hole 14 is provided also in the frame 2. The purpose and size of the holes 12 and 14 will become apparent from the following description.

The mounting device 4 includes a main or first elastic member 16 of an elastic material such as a natural or synthetic rubber, preferably in a substantially cylindrical form as a whole. The hardness of the main elastic member is suitably selected according to the weight of the cab 6 to be supported. For example, for the cab of ordinary tractors, an elastic material having a durometer hardness of 55° can be used. A through hole 24 is formed in the central part of the main elastic member 16 including a large-diameter or first portion 18 and a small-diameter or second portion 20 defining a shoulder portion 22. The lower end of the main elastic member 16 projects at its central part beyond its peripheral part by a distance S. The lower end of the main elastic member 16 is preferably curved gently in a concave form from the peripheral part to the central part as shown in the drawings. The distance S will be described later on. In the through hole 14 of the main elastic member 16, a tubular inward or first rigid member 26 having substantially the same length as the through hole 14 is fixed. The inward rigid member 26 can be fixed in the hole 14 by, for example, baking and bonding its outer wall onto the inner wall of the hole 14 at the time of vulcanizing the main elastic member 16. On the peripheral side wall of the large-diameter portion 18 of the main elastic member 16 an outward or second rigid member 28 preferably of a hollow cylindrical form as a whole is fixed. The outward rigid member 28 preferably has a flange portion 30 extending inwardly at its upper part and fixed to the shoulder part so that the outward rigid member does not separate easily from the main elastic member by a shear force acting between them. Like the inward rigid member 26, this outward rigid member 28 can also be fixed to the main elastic member by baking and bonding at the time of vulcanizing the main elastic member 16.

The small-diameter portion 20 of the main elastic member 16 is inserted in a hole 12 whose diameter is somewhat larger than the outside diameter of the small-diameter portion 20 and which is formed in the floor 10, when the cab 6 is mounted on the frame 2.

The mounting device also includes a preferably annular second elastic member or elastic pad 32 having at its center a through opening 34 adapted to receive the small-diameter portion 20 of the main elastic member 16. The elastic member 32 can be made of a suitable elastic member such as a natural or synthetic rubber. The outside diameter of the elastic member 32 is preferably substantially the same, or somewhat larger than, the outside diameter of the outward rigid member 28 fixed to the main elastic member 16. The thickness of the elastic member 32, as is illustrated in FIG. 2, is equal to, or somewhat larger than, the length of the small-diameter portion 20 projecting upwardly from the floor 10 when the main elastic member 16 is mounted on the frame 2 and its small-diameter portion is inserted in the hole 12 of the floor 10.

The axial part of the mounting device 4 is inserted in the inward rigid member 26 fixed in the through hole 24 of the main elastic member 16, and includes a bolt 36 inserted in a hole 14 formed in the frame 2 and a nut 38 to secure the bolt 36. The bolt 36 and nut 38 are equipped with washers 40 and 42 respectively. The hole 14 is a circular hole having a diameter suitable for insertion of the axial portion of the bolt 36, and preferably has a diameter equal to, or somewhat smaller than, the inside diameter of the inward rigid member 26.

In order to mount the cab 6 elastically on the frame 2, the main elastic member having the inward rigid member 26 and the outward rigid member 28 fixed thereto are disposed on the frame 2 so that the inside hole of the inward rigid member 26 registers with the hole 14 formed in the frame 2. The small diameter 20 of the main elastic member 16 is received in the hole 12 of the floor 10, and a part of it projects beyond the floor 10. By receiving the small-diameter portion 20 projecting beyond the floor 10 in the through opening 34, an elastic member 32 is disposed on the main elastic member 16. Accordingly, the floor 10 is held between the flange portion 30 of the outward rigid member 28 and the elastic member 32. After this, the washer 40 is disposed on the elastic member 32, and the bolt 36 is inserted in the inward rigid member 26 and the hole 14 formed in the frame 2. The washer 42 is provided from underneath the frame 2, and the nut 38 is screwed to the bolt 36. The bolt 36 and the nut 38 are fastened, for example, with a tightening torque of 10.5 Kg.m (JIS).

The mounting device 4 is connected to frame 2 by the fastening of the inward rigid member 26 by means of the bolt 36 and the nut 38. By holding the floor 10 between the flange portion 30 of the outside rigid member 28 and the elastic member 32, the mounting device 4 is linked to the cab 6. Accordingly, the frame 2 and the floor 10 are linked via the main elastic member 16, and the cab 6 is elastically supported on the frame 2 in the vertical direction by the shear elasticity of the main elastic member 16 designated by an arrow A in FIG. 2.

In order that the main elastic member 16 always elastically supports the cab 6 by its shear elasticity, the above distance S must satisfy the following relation $$S > FG/K$$

wherein $K$ is the shear spring coefficient of the main elastic member, $G$ is the maximum acceleration in the vertical direction that can be anticipated, and $F$ is the mass of the cab for each mounting device.

The lower end of the outward rigid member 28 must be separated from the frame 2 at least by the above distance S so that upon contact with the frame 2, it does not connect the frame 2 to the floor 10 without an intermediary of the elastic member. For example, assuming $K=500$ Kg per cm, $G=7g$ and $F=100$ Kg/g, separating distance $S$ would be greater than 1.4 cm.

Since the mounting device 4 in accordance with this invention elastically supports the cab 6 in the vertical direction by the shear elasticity of the main elastic member 16, it can stably support the cab and fully reduce the vibration transmitted from the frame to the cab, as compared with the known mounting devices which support the cab by the compression elasticity of the elastic member.

In the horizontal direction, the mounting device 4 of this invention elastically supports the cab with high reliability by the compression elasticity of the main elastic member 16. Furthermore, since in the mounting device 4 in accordance with this invention, the peripheral side wall of the main elastic member 16 is covered by the outside rigid member 28 fixed thereto, the main elastic member has resistance to deterioration, and therefore a relatively long effective life.

FIG. 5 shows a modified embodiment of the mounting device in accordance with this invention. In FIG. 5, an additional annular third elastic member 44 is disposed between the flange portion 30 of the outside rigid member 28 and the under-surface of the floor 10 so as to avoid the problems of noises and wear caused by the metal-metal contact of the flange portion 30 and the floor 10. The elastic member 44 is made of a suitable elastic material such as a natural or synthetic rubber. In the center of the elastic member 44, a through opening 46 is formed through which the small-diameter portion 20 of the main elastic member 16 passes. Preferably, the outside and inside diameters of the elastic member 44 are respectively nearly equal to the outside and inside diameters of the flange portion of the outward rigid member 28. In the embodiment of FIG. 5, the floor 10 does not make any contact with the metallic portion of the mounting device 4.

FIG. 6 shows another modified embodiment of the mounting device in accordance with this invention. In the embodiment of FIG. 6, a flange portion 48 extending radially outwardly is formed integrally at the lower end of the inward rigid member 26 so that the mounting device is more stably erect on the frame 2. By this flange portion 48, the contact area between the inward rigid member 26 and the frame 2 increases, and the inclination resistance of the mounting device also increases.

While the invention has been described in detail with reference to some specific preferred embodiments, the invention is not limited to them, but it is evident that various modifications and changes are possible without departing from the spirit and scope of the invention.

What we claim is:

1. A mounting device elastically supporting an upper structure on a frame to isolate the transmission of vibratory energy therebetween comprising
   a first elastic member having a hole formed axially therethrough, and including a generally cylindrical first portion and a generally cylindrical second portion, said second portion extending through a hole formed in said upper structure, and having a diameter less than that of said first portion and separated from said first portion by an annular shoulder portion,
   a tubular first rigid member disposed within the hole formed through said first elastic member and being substantially co-extensive therewith axially,
   a generally cylindrical second rigid member circumventing the first portion of said first elastic member and being substantially co-extensive therewith axially, a lower end of said second rigid member spaced-apart axially from said frame at a predetermined distance and a lower end of the second portion of said first elastic member extending axially therebeyond,
   an annular flange secured on an upper end of said second rigid member and extending radially inwardly therefrom between the annular shoulder portion of said first elastic member and said upper structure,
   an annular second elastic member disposed in circumventing relationship about the second portion of said first elastic member and further disposed on an outer side of said upper structure,
   an annular third elastic member disposed in circumventing relationship about the second portion of said first elastic member and further disposed between an inner side of said upper structure and the annular flange secured to said second rigid member, and
   bolt means extending through said upper structure, said frame and said first rigid member to thereby universally support said upper structure elastically on said frame.

2. The mounting device of claim 1 wherein the lower end of said first elastic member is curved to define a concavity extending radially inwardly from its periphery to its center.

3. The mounting device of claim 1 wherein the lower end of said first elastic member projects axially beyond the lower end of said second rigid member by the distance S defined by the following equation:

$$S > FG/K$$

wherein $K$ is the shear spring coefficient of said first elastic member,
   $G$ is the maximum acceleration in the vertical direction that can be anticipated, and
   $F$ is the mass of said first elastic member.

4. The mounting device of claim 1 wherein said first rigid member has a flange portion extending radially outwardly from its lower end.

5. The mounting device of claim 1 wherein said upper structure constitutes a floor of a cab of a construction vehicle.

6. The mounting device of claim 1 wherein said first rigid member is secured to said first elastic member.

7. The mounting device of claim 1 wherein said second rigid member is secured to said first elastic member.

* * * * *